Sept. 29, 1942.  R. S. PARKER  2,297,021
AXLE BOX DUST SEAL
Filed April 11, 1942   3 Sheets-Sheet 2
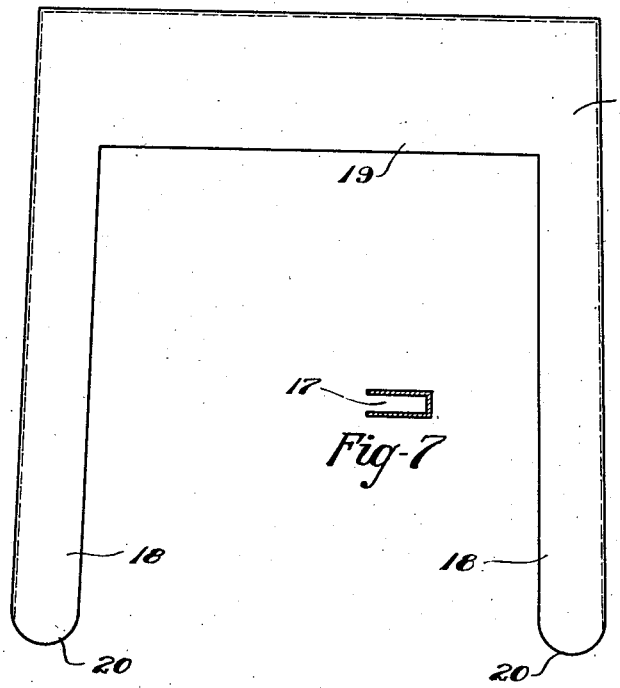
Fig-5
Fig-7
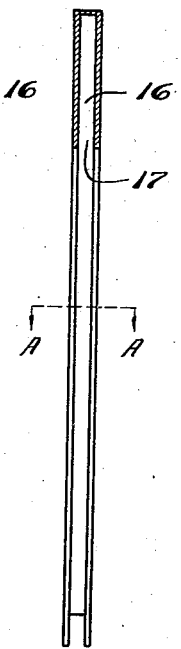
Fig-6
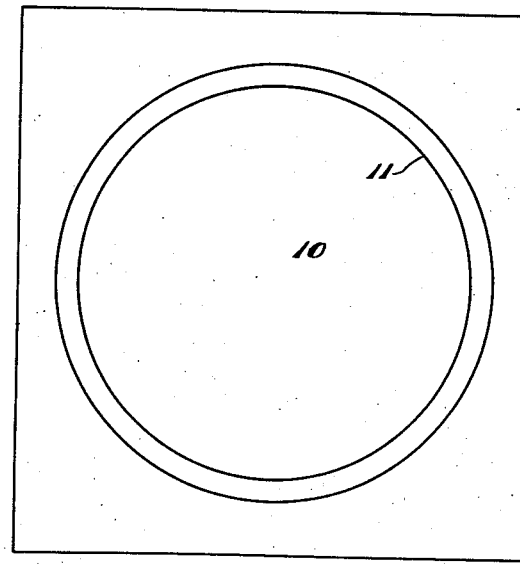
Fig-3
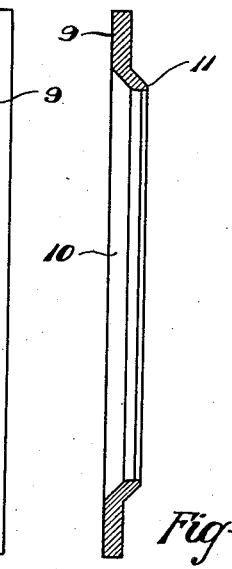
Fig-4
INVENTOR
ROLLAND STILWELL PARKER
BY
Fraser, Myers & Manley
ATTORNEYS

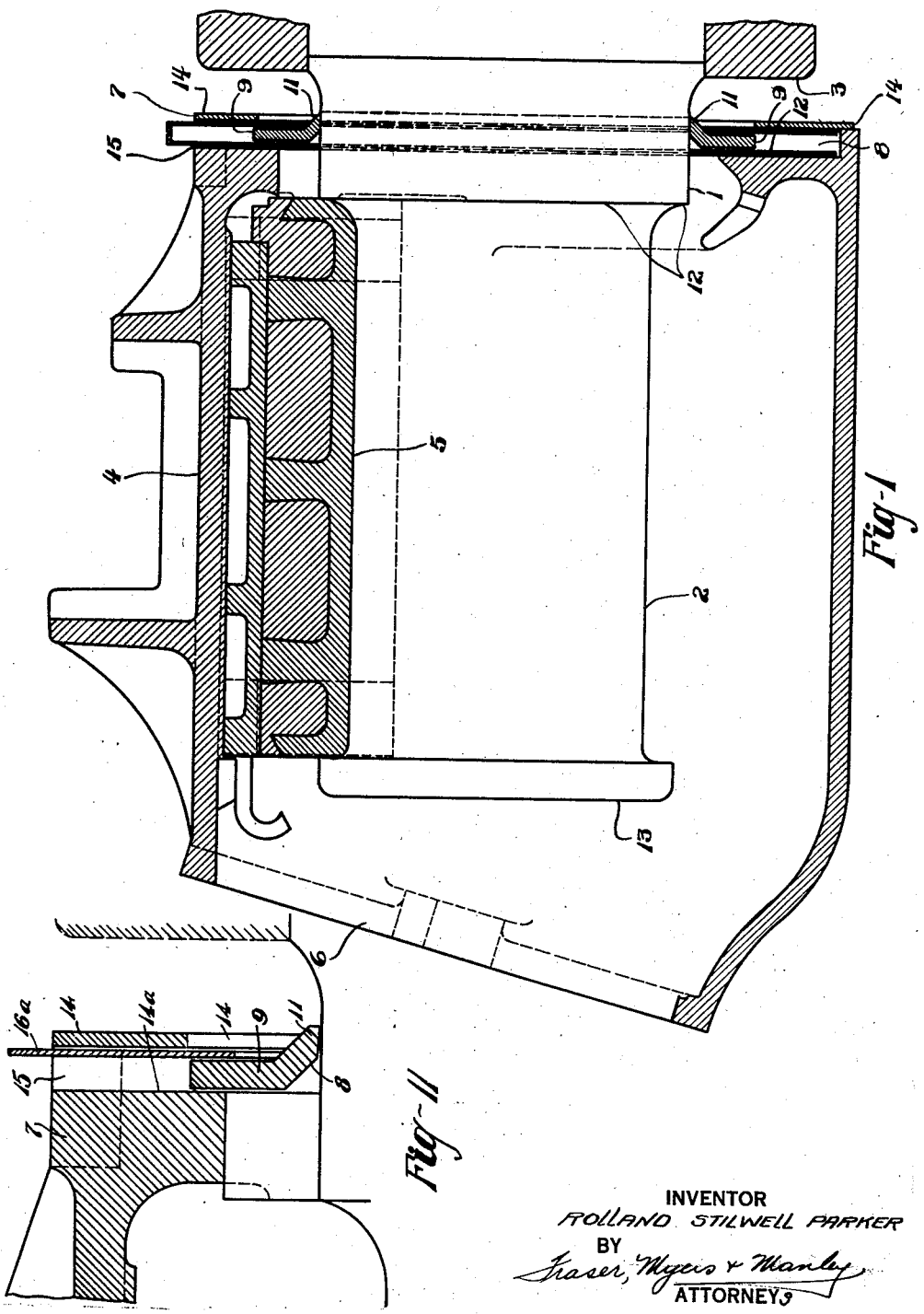

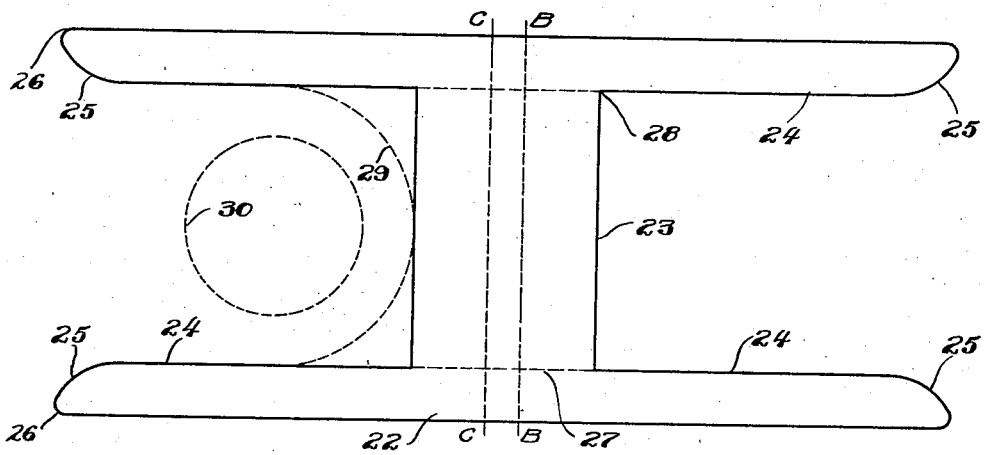
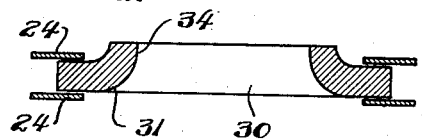
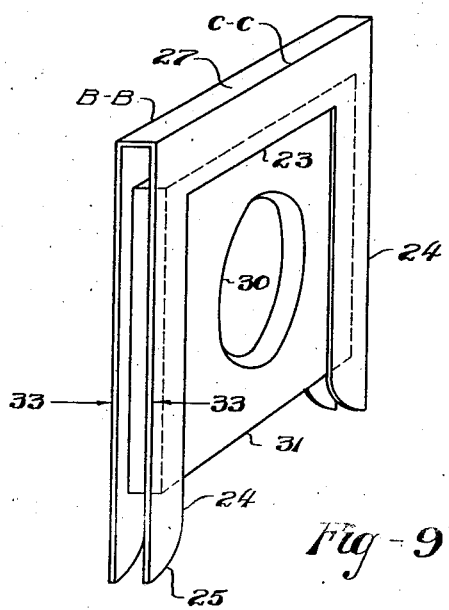
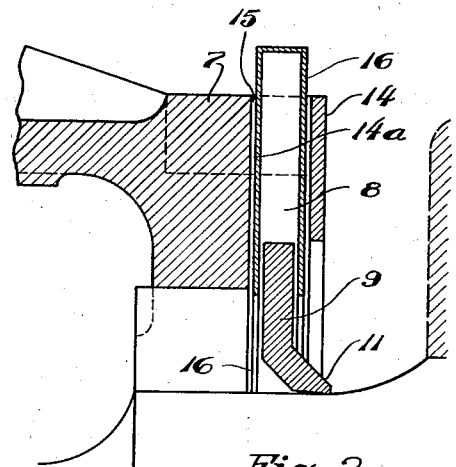

Patented Sept. 29, 1942

2,297,021

UNITED STATES PATENT OFFICE 2,297,021

AXLE BOX DUST SEAL

Rolland Stillwell Parker, Calcutta, British India

Application April 11, 1942, Serial No. 438,524
In British India February 27, 1941

5 Claims. (Cl. 286—6)

This invention relates to improvements in dust seals adapted for use in axle box assemblies of railway vehicles and the like.

In railway vehicle structures a bearing brass, fixed within an axle box, rests upon a journal portion of the axle which protrudes beyond the wheel. Between the wheel and the brass is an intermediate axle portion, usually rather small axially, but somewhat enlarged diametrically as compared to the journal. It is customary to provide the axle box with a dust seal member of leather, fibre, or other suitable material, arranged to circumferentially engage the said intermediate axle portion whereby to prevent ingress of dust or other foreign matter into the axle box. The said dust seal member preferably has a sealing lip which extends inwardly toward the hub of the wheel. It is understood, of course, that if dust or foreign matter gets into the axle box, the lubricant therein becomes contaminated and the bearing surfaces of the brass and the axle journal may be damaged or worn very quickly.

Because of the small space which ordinarily remains between the inner end of an axle box and the wheel in such an assembly, and the seemingly insurmountable resulting difficulty which would be encountered in securing a dust seal in place after the axle box and axle are assembled in their respective operating positions, it has been the practice, heretofore, to secure the dust seal in position within a dust seal chamber at the inner end of the axle box before the latter is moved over the axle to its proper operating position.

As the several parts involved are quite heavy and cumbersome, the sealing portions of the dust seal are often damaged during the assembling of the structure so that they are of little use for their intended purpose. This is particularly true if a sealing lip, provided on the dust seal, extends inwardly, as is preferred and most efficient, rather than outwardly. The probability of damaging the dust seal during the assembling of such structures is greatly increased by reason of the fact that the axle opening in the dust seal is usually either a very close fit with the axle or is somewhat smaller than the axle so that it will positively engage and work upon the latter when in service. This being so, it is readily understood that it is practically impossible to avoid damaging the dust seal while assembling an axle box with the dust seal already positioned thereon, as under such assembling conditions it is extremely difficult to guide the seal over and onto the several enlarged portions of the axle. Even a limited quantity of dust or foreign matter within the axle box may cause serious trouble, and hence any damage to the dust seal must be avoided.

The principal objects of the present invention are to provide a dust seal structure which is relatively simple and inexpensive and which may be easily assembled with the axle and axle box without being damaged. Other objects will be apparent from the present specification.

The objects of the invention are attained, generally, by providing a dust seal assembly including a sealing member which is passed over the end of the axle and onto the mentioned intermediate portion of the axle before anything is done toward bringing the axle box into operating position upon the axle. It will be evident that when the sealing member is being handled separately, as just explained, it is a simple matter to coax it over the enlarged end of the axle and the shoulder defining the outer end of the mentioned intermediate portion of the axle without damaging the delicately formed lip or other sealing surface of the sealing member.

After the sealing member is coaxed to, or very nearly to, its proper operating position, the axle box is then moved over and onto the axle. The hole or opening, accommodating the axle, at the inner end of a dust seal chamber located at the inner end of the axle box, is made large enough to permit the previously positioned sealing member to freely pass into said chamber as the axle box is moved into its proper operating position. This, of course, leaves a clearance between the periphery of the sealing member and the adjacent inner surfaces of the dust seal chamber, but, according to the present invention, an opening is provided at one side of said chamber and an adapter is provided which is inserted into said side opening and moved, in a radial plane relatively to the axis of the axle, into position within the axle box. The adapter is U-shaped and so designed that it substantially closes the mentioned clearance and holds the sealing member in position within the dust seal chamber.

The invention will now be described with reference to the accompanying drawings, in which:

Fig. 1 is a section through part of the axle box assembly showing the axle and journal in elevation therein, Fig. 2 is a fragmental section, to an enlarged scale, showing a detail of Fig. 1, Fig. 3 is an elevational view of the sealing member, and Fig. 4 is a section thereof.

Fig. 5 is an elevational view of one form which the spacing adapter may take, and Fig. 6 is a cross section of this adapter, whilst Fig. 7 is a cross section on line A, A of Fig. 6.

Fig. 8 is a plan view, to a smaller scale than in Figs. 1 to 5, of a sheet metal blank which can be used to form a preferred form of the adapter.

Fig. 9 is a perspective view of this blank when bent to form the adapter, and of a sealing member showing the assembled relationship of the two.

Fig. 10 is a cross section of this form of adapter taken on a horizontal line through the centre of Fig. 9.

Fig. 11 is a fragmental section, somewhat similar to Fig. 2, showing an axle box assembly including a further alternative form of adapter.

Referring to Figs. 1 and 2, the axle 1 has the journal 2 formed on the end thereof, whilst the wheel hub is shown at 3. The axle box 4 is provided with the usual bearing brass 5 which rests on the journal 2. In service the front end 6 of the axle box will be closed by an axle box cover which is not shown. At the rear end 7 of the axle box a chamber, cavity or space 8 is provided, sometimes known as the dust-seal-well or chamber, and is intended to accommodate the dust seal 9. This dust seal 9 has an aperture therein 10 (see Figs. 3 and 4) and the edge of this aperture 10 preferably is provided with a flange or lip 11.

In ordinary known practice when a dust seal, formed in a single piece, had a lip it had necessarily to extend towards the interior of the axle box in order that when it has been brought into position it might ride over the sharp edge 12 on the axle. In the known practice the sealing member is placed in position within its chamber 8 in the axle box before the axle box is lifted into position, and hence this lip must extend towards the left in Figs. 1 and 2, in order that when the axle box is being moved into position it may ride over the flanged end 13 of the journal 2 and also over this sharp edge 12.

According to the present invention however the intention is that this lip 11 shall extend away from the interior of the axle box and towards the hub 3 of the adjacent wheel on the axle.

The chamber 8 for the reception of the sealing member is a relatively narrow chamber having a thin plate wall 14. This wall has an aperture therein which in the modification needed for carrying out this invention is sufficiently large to enable the sealing member 9 to enter the chamber when the axle box is brought to its normal working position upon the journal. Should the sealing member 9, when the axle box is in place, not be fully inside the chamber 8 it may be pressed or coaxed back into such chamber with no damage to itself or to its lip 11. A slot or aperture 15 is provided through the top of the chamber 8, and into this slot the locating adapter or member 16 can be inserted. One form of this locating adapter 16 is illustrated in Figs. 5, 6 and 7. This form comprises a channel shaped member or inverted U-shaped member in general form, which may conveniently be made of thin sheet material bent to present a hollow or groove 17 on its inner side. This adapter 16 is inserted through the slot 15 and is pushed downwards so that its two limbs 18, 18, (see Fig. 5) engage the top corners of the seal member 9, and the adapter is then evenly forced downwards sliding between the guiding surfaces formed by the outer wall 14 and the inner wall 14a, (see Fig. 2) of the chamber 8. It is forced home so that it finally embraces the seal member 9 along its two side edges and along the top edge at 19 (see Fig. 5). The size of the groove 17 in the limbs and in the top part of the adapter 16 is such that they will closely fit, embrace and overlap the corresponding edges of the seal member. The closeness of the fit will be such as to prevent the passage of dust or the ready escape of oil between the seal member 9 and the adapter 16. Nevertheless the engagement should not be so tight that movement cannot take place, as it is desired that the seal member 9 should be able readily to accommodate itself to the axle 1 and to the adapter 16 when being placed in position and in service.

The adapter 16 is itself a close fit in the top and in the sides of the chamber 8, being a neat sliding fit therein so that dust cannot enter from the top, nor get round the side of the adapter, and between the adapter and the walls of the chamber 8.

Referring now to Figs. 5, 6 and 7, the adapter, in the form illustrated, has rounded ends 20, 20 to its two limbs so that it may the more readily be caused to slip onto the top edges of the seal member 9. The limbs of the adapter may be slightly wider at the bottom than at the top so that the adapter will have a certain amount of spring therein, which will assist it to engage more closely the walls of the chamber or cavity 8 therefor.

It should be noted that the adapter is itself held in place in the chamber 8 and is thus located in a plane perpendicular to the longitudinal axis of the axle. It will thus hold the sealing member 9 in such plane. Furthermore, it will stiffen the edges of the sealing member so that the said member is the more securely held and acts better as a dust seal against the part 21 (see Fig. 1) of the cross wall dividing the chamber 8 from the axle box proper.

Turning now to Fig. 8, this shows a blank, such as a blank which may be stamped out of a piece of sheet metal and may subsequently be used for making a preferred form of the adapter, whilst Fig. 9 shows in perspective view the adapter which is made by bending this blank.

In Fig. 8 the blank is shown as roughly of H-form, having a central horizontal member or cross-piece 23 and side parts 24. The ends of these side parts or limbs 24, 24, may be curved as shown at 25, 25, and the corners 26 may also be slightly rounded off so that when the adapter is made, these limb parts can readily be pushed on to the sealing member. The rounded corners 26 will also enable the adapter the more readily to be introduced through the slot shown at 15 in Figs. 1 and 2.

The blank will be bent along two lines parallel to each other and parallel to the long axis of the central cross-piece 23 of the H. These two lines are shown dotted at B—B and C—C. When the said blank is bent it forms a shape as shown in Fig. 9 and as shown in cross section in Fig. 10 and from this it will be seen that the vertical limbs of the U-shape form have open sides as indicated between the arrows 32 and 33 in Fig. 9 and as clearly shown in the cross section in Fig. 10.

If desired a cut may be made between the outer part of the cross-piece 23 of the blank and the limb part. One of these cuts is shown at 27 and would enable the limbs 24, 24, to be bent at right angles to the part 23, and then the edges of this central part 23 themselves to be bent.

As shown in Fig. 8, the H has sharp corners at the re-entrant angles, such as that indicated by the reference 28. However, if preferred the blank may be rounded off on each side of the central piece 23 as indicated on one side by the dotted line 29. The curve 29 however would be of considerably larger radius than the radius of the axle to which the sealing member is to be fitted and this curve when the adapter is forced into position in the axle box should clear the lip 34 of the sealing member 31.

In Fig. 8 the size of the axle is indicated by the reference 30. In Fig. 9 the sealing member is shown diagrammatically and it is to be understood that the lip 34 shown in Fig. 10 will be on the further side of the sealing member 31 and will not be seen. Such lip as already explained will project away from the interior of the axle box and towards the wheel hub.

As already indicated, other methods of making the adapter or its equivalent may be used. For example, as shown in Fig. 11, a single U-shaped plate 16a may be used as the adapter which when the sealing member 9 is in place could be forced into position between the sealing member and the outer side 14 of the recess or dust-seal-chamber so that when the said plate member is in place the said sealing member can no longer pass through the aperture in the plate 14 and is also engaged between the said plate adapter and the inner side or wall 14a of the dust-seal-chamber. Instead of a single U-shape plate adapter, it is also possible to use two such U-shaped plate adapters, one being placed as last mentioned on the outer side of the sealing member and the other bing placed on the inner side of the sealing member. When two such plates are used the sealing member is more securely and firmly supported than when one such plate is used.

If the plate 14 at the rear end of the axle box which forms the rear wall of the dust seal chamber is a separate plate which is welded in position in making the axle box, it is then possible to machine the inner sides of the dust-seal-chamber before this plate is welded in position, and thus convenient accuracy may be attained to enable the adapter or locating member to slide into position against machined surfaces.

It will of course be understood that suitable modifications may be made in the details without departing from the scope of the invention. For example, the dust seal 9 may be of any desired type, its lip 11 may be provided, if desired, with spring means which will cause the lip to press upon the surface of the axle. The constructions and shape of the locating adapter may be varied, and need not necessarily follow exactly the shape shown.

I claim:

1. Means for preventing the penetration of foreign matter into an axle box adapted to receive therewithin a journal located near the outer end of an axle carrying a wheel disposed inwardly with respect to said journal; the said means comprising a sealing member, adapted to be passed over the end of the axle and substantially into operating position thereon before the said axle is inserted into the axle box and having a radially extending body portion of substantial width and a sealing portion adapted to circumferentially engage the axle and form a dust seal therewith; a dust seal housing, at the inner end of the axle box, having at its inner end an opening through which the axle extends, the said opening being of sufficient size to permit the said sealing member to pass freely therethrough into said housing as the axle box is moved into operating position upon the axle; and a U-shaped adapter, adapted to be inserted into said housing, when the axle is in assembled position within the axle box, by movement in a radial plane, the said adapter being of substantial width between its inner and outer edges, and having an inner marginal surface on one face thereof adapted to overlap and engage a side surface of the body portion of said sealing member about the greater part of the periphery thereof, and an outer marginal surface on the opposite face thereof adapted to overlap and engage the greater circumferential part of an inner marginal surface of said housing immediately surrounding said opening and to coact with the said inner surface and an opposed inner surface of the housing whereby to hold said sealing member in position within said housing, the adapter, further, being adapted to coact with the sealing member and the said housing whereby to close the space between the body of the sealing member and the said housing along the said overlapping portions to prevent passage of foreign matter into the axle box.

2. Dust sealing means according to claim 1, in which the sealing portion of said sealing member comprises a sealing lip which extends angularly from the body portion of the sealing member toward the mentioned wheel.

3. Dust sealing means according to claim 1, in which the said housing is open at one side thereof whereby to permit the insertion of said adapter thereinto.

4. Dust sealing means according to claim 1, in which the adapter comprises a pair of spaced U-shaped side members adapted to engage opposed inner surfaces of said housing, and adapted to slide laterally into said housing to a position wherein the said spaced side members overlap and substantially engage the said body portion of the sealing member and coact with said sealing member and said housing to close the space between the latter and the sealing member.

5. Dust sealing means according to claim 1, in which the said adapter comprises a single U-shaped plate adapted to be inserted between the sealing member and the inside wall of the said housing surrounding said opening.

ROLLAND STILLWELL PARKER.